(12) United States Patent
Papasakellariou et al.

(10) Patent No.: US 8,543,124 B2
(45) Date of Patent: Sep. 24, 2013

(54) RESOURCE INDEXING FOR ACKNOWLEDGEMENT SIGNALS IN RESPONSE TO RECEPTIONS OF MULTIPLE ASSIGNMENTS

(75) Inventors: Aris Papasakellariou, Houston, TX (US); Joon-Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 442 days.

(21) Appl. No.: 12/986,675

(22) Filed: Jan. 7, 2011

(65) Prior Publication Data

US 2011/0165906 A1    Jul. 7, 2011

Related U.S. Application Data

(60) Provisional application No. 61/293,008, filed on Jan. 7, 2010.

(51) Int. Cl.
*H04W 72/00* (2009.01)

(52) U.S. Cl.
USPC ........ 455/450; 455/451; 455/452.1; 455/453; 455/515; 455/516; 370/315; 370/316; 370/320; 370/328; 370/329

(58) Field of Classification Search
USPC ............ 455/450–455, 522, 69–70, 509–516; 370/32–330
See application file for complete search history.

(56) References Cited

U.S. PATENT DOCUMENTS

| | | | |
|---|---|---|---|
| 2007/0058595 A1* | 3/2007 | Classon et al. | 370/337 |
| 2009/0093216 A1* | 4/2009 | Sun et al. | 455/62 |
| 2009/0245194 A1* | 10/2009 | Damnjanovic et al. | 370/329 |
| 2010/0296473 A1 | 11/2010 | Kim et al. | |
| 2011/0228731 A1* | 9/2011 | Luo et al. | 370/329 |
| 2011/0243066 A1* | 10/2011 | Nayeb Nazar et al. | 370/328 |

FOREIGN PATENT DOCUMENTS

KR    1020090086040    8/2009

* cited by examiner

*Primary Examiner* — Fayyaz Alam
(74) *Attorney, Agent, or Firm* — The Farrell Law Firm, P.C.

(57) ABSTRACT

User Equipment (UE) transmits an acknowledgement signal in response to the reception of multiple Scheduling Assignments (SAs) transmitted by a base station. The SAs consist of Information Elements (IEs) including a Transmission Power Control (TPC) IE providing adjustments for the transmission power of the acknowledgement signal. The TPC IE in a first SA of the multiple SAs is used to provide the previous adjustments and the TPC IEs in the remaining of the multiple SAs are used to provide an indication of the resource used for the transmission of the acknowledgment signal.

20 Claims, 15 Drawing Sheets

RESOURCE INDEXING FOR ACKNOWLEDGEMENT SIGNALS IN RESPONSE TO RECEPTIONS OF MULTIPLE ASSIGNMENTS

PRIORITY

The present application claims priority under 35 U.S.C. §119(e) to a U.S. Provisional Application No. 61/293,008, entitled "Indexing of Resources for the Transmission of Acknowledgement Signals in a Communication System with Multiple Component Carriers," which was filed on Jan. 7, 2010, the entire disclosure of which is incorporated herein by reference.

BACKGROUND OF THE INVENTION

1. Field of the Invention

The present invention relates generally to wireless communication systems and, more particularly, to the transmission of acknowledgment signals in the uplink of a communication system that are generated in response to the reception of multiple scheduling assignments.

2. Description of the Related Art

A communication system consists of a DownLink (DL), conveying transmissions of signals from a base station (also known as "Node B") to User Equipment (UEs), and of an UpLink (UL), conveying transmissions of signals from UEs to the Node B. A UE, also commonly referred to as a terminal or a mobile station, may be fixed or mobile and may be a wireless device, a cellular phone, a personal computer device, or the like. A Node B is generally a fixed station and may also be referred to as a Base Transceiver System (BTS), an access point, or the like.

The UL of the communication system supports transmissions of data signals carrying the information content, control signals providing information associated with the transmission of data signals in the DL of the communication system, and Reference Signals (RS) which are also known as pilot signals. The DL also supports transmissions of data signals, control signals, and RS. UL data signals are conveyed through the Physical Uplink Shared CHannel (PUSCH). DL data channels are conveyed through the Physical Downlink Shared CHannel (PDSCH). In the absence of PUSCH transmissions, a UE conveys Uplink Control Information (UCI) through the Physical Uplink Control CHannel (PUCCH), otherwise, UCI may be conveyed together with data in the PUSCH. DL control signals may be broadcast or UE related. UE-specific control channels can be used, among other purposes, to provide to UEs Scheduling Assignments (SAs) for PDSCH reception (DL SAs) or PUSCH transmission (UL SAs). The SAs are transmitted from the Node B to respective UEs using Downlink Control Information (DCI) formats through respective Physical Downlink Control CHannels (PDCCHs).

UL control signals include acknowledgement signals associated with the application of a Hybrid Automatic Repeat reQuest (HARQ) process and are typically in response to the correct, or incorrect, reception of the data Transport Blocks (TBs) conveyed in the PDSCH. FIG. 1 illustrates a PUCCH structure for HARQ ACKnowledgement (HARQ-ACK) signal transmission in a Transmission Time Interval (TTI), which in this example consists of one sub-frame. The sub-frame 110 includes two slots. Each slot 120 includes $N_{symb}^{UL}$ symbols for the transmission of HARQ-ACK signals 130 or for Reference Signals (RS) 140 which enable coherent demodulation of the HARQ-ACK signals. Each symbol further includes a Cyclic Prefix (CP) to mitigate interference due to channel propagation effects. The transmission in the first slot may be at a different part of the operating BandWidth (BW) than in the second slot in order to provide frequency diversity. The operating BW is assumed to consist of frequency resource units which will be referred to as Resource Blocks (RBs). Each RB is assumed to consist of $N_{sc}^{RB}$ subcarriers, or Resource Elements (REs), and a UE transmits HARQ-ACK signals and RS over one RB 150.

FIG. 2 illustrates a structure for the HARQ-ACK signal transmission using a Constant Amplitude Zero Auto-Correlation (CAZAC) sequence in one slot of the PUCCH. The transmission in the other slot is assumed to effectively have the same structure. The HARQ-ACK bits b 210 modulate 220 a CAZAC sequence 230, for example using Binary Phase Shift Keying (BPSK) or Quaternary Phase Shift Keying (QPSK) modulation, which is then transmitted after performing an Inverse Fast Frequency Transform (IFFT) as it is next described. The RS 240 is transmitted through the unmodulated CAZAC sequence.

An example of CAZAC sequences is given by the following Equation (1):

$$c_k(n) = \exp\left[\frac{j2\pi k}{L}\left(n + n\frac{n+1}{2}\right)\right] \quad \text{Eq. (1)}$$

where L is a length of the CAZAC sequence, n is an index of a sequence element, n={0, 1, 2, ..., L−1}, and k is a sequence index. If L is a prime integer, there are L−1 distinct sequences which are defined as k ranges in {1, 2, ..., L−1}. Assuming that 1 RB includes $N_{sc}^{RB}=12$ REs, CAZAC sequences with even length can be directly generated through computer search for sequences satisfying the CAZAC properties.

FIG. 3 illustrates a transmitter structure for a CAZAC sequence that can be used without modulation as RS or with BPSK or QPSK modulation as HARQ-ACK signal. The frequency-domain version of a computer generated CAZAC sequence is used in Step 310. The first RB and second RB are selected in Step 320, for transmission of the CAZAC sequence in the first slot and in the second slot, in Step 330, an IFFT is performed in Step 340, and a Cyclic Shift (CS), as it is subsequently described, is applied to the output in Step 350. Finally, the CP is inserted in Step 360 and filtering through time windowing is applied to the transmitted signal 380. A UE is assumed to apply zero padding in REs that are not used for its signal transmission and in guard REs (not shown). Moreover, for brevity, additional transmitter circuitry such as digital-to-analog converter, analog filters, amplifiers, and transmitter antennas as they are known in the art, are not shown.

FIG. 4 illustrates a receiver structure for the HARQ-ACK signal reception. An antenna receives the RF analog signal and after further processing units (such as filters, amplifiers, frequency down-converters, and analog-to-digital converters) the digital received signal 410 is filtered in Step 420 and the CP is removed in Step 430. Subsequently, the CS is restored in Step 440, a Fast Fourier Transform (FFT) is applied in Step 450, the first RB and the second RB of the signal transmission in Step 460 in the first slot and in the second slot, are selected in Step 465, and the signal is correlated in Step 470 with the replica of the CAZAC sequence in Step 480. The output 490 can then be passed to a channel estimation unit, such as a time-frequency interpolator, in case of the RS, or to a detection unit for the transmitted HARQ-ACK signal.

Different CSs of the same CAZAC sequence provide orthogonal CAZAC sequences and can therefore be allocated to different UEs for HARQ-ACK signal transmission in the same RB and achieve orthogonal UE multiplexing. This principle is illustrated in FIG. 5. In order for the multiple CAZAC sequences 510, 530, 550, 570 generated correspondingly from the multiple CSs 520, 540, 560, 580 of the same root CAZAC sequence to be orthogonal, the CS value Δ 590 should exceed the channel propagation delay spread D (including a time uncertainty error and filter spillover effects). If $T_S$ is the symbol duration, the number of such CSs is equal to the mathematical floor of the ratio $T_S/D$ the number of such CSs is $\lfloor T_S/D \rfloor$ where the $\lfloor \ \rfloor$ (floor) function rounds a number to its lower integer.

In addition to orthogonal multiplexing of different HARQ-ACK signals in the same RB using different CS of a CAZAC sequence, orthogonal multiplexing can also be achieved in the time domain using Orthogonal Covering Codes (OCC). For example, in FIG. 2, the HARQ-ACK signal can be modulated by a length-4 OCC, such as a Walsh-Hadamard (WH) OCC, while the RS can be modulated by a length-3 OCC, such as a DFT OCC (not shown). In this manner, the multiplexing capacity is increased by a factor of 3 (determined by the OCC with the smaller length). The sets of WH OCCs, $\{W_0, W_1, W_2, W_3\}$, and DFT OCCs, $\{D_0, D_1, D_2\}$, are:

$$\begin{bmatrix} W_0 \\ W_1 \\ W_2 \\ W_3 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}, \begin{bmatrix} D_0 \\ D_1 \\ D_2 \end{bmatrix} = \begin{bmatrix} 1 & 1 & 1 \\ 1 & e^{-j2\pi/3} & e^{-j4\pi/3} \\ 1 & e^{-j4\pi/3} & e^{-j2\pi/3} \end{bmatrix}.$$

Table 1 below presents an example for the mapping for the PUCCH resource $n_{PUCCH}$ used for a HARQ-ACK signal transmission to an OCC $n_{OCC}$ and a CS α assuming a total of 12 CS per symbol for the CAZAC sequence.

TABLE 1

HARQ-ACK Resource Mapping to OCC and CS

| | OC for HARQ-ACK and for RS | | |
|---|---|---|---|
| CS | $W_0, D_0$ | $W_1, D_1$ | $W_3, D_2$ |
| 0 | $n_{PUCCH} = 0$ | | $n_{PUCCH} = 12$ |
| 1 | | $n_{PUCCH} = 6$ | |
| 2 | $n_{PUCCH} = 1$ | | $n_{PUCCH} = 13$ |
| 3 | | $n_{PUCCH} = 7$ | |
| 4 | $n_{PUCCH} = 2$ | | $n_{PUCCH} = 14$ |
| 5 | | $n_{PUCCH} = 8$ | |
| 6 | $n_{PUCCH} = 3$ | | $n_{PUCCH} = 15$ |
| 7 | | $n_{PUCCH} = 9$ | |
| 8 | $n_{PUCCH} = 4$ | | $n_{PUCCH} = 16$ |
| 9 | | $n_{PUCCH} = 10$ | |
| 10 | $n_{PUCCH} = 5$ | | $n_{PUCCH} = 17$ |
| 11 | | $n_{PUCCH} = 11$ | |

The SAs are transmitted in elementary units which are referred to as Control Channel Elements (CCEs). Each CCE consists of a number of REs and the UEs are informed of the total number of CCEs, $N_{CEE}$, in a DL sub-frame through the transmission of a Physical Control Format Indicator CHannel (PCFICH) by the Node B. For a Frequency Division Duplex (FDD) system, the UE determines $n_{PUCCH}$ from the first CCE, $n_{CCE}$, of the DL SA with the addition of an offset $N_{PUCCH}$ the Node B configures to the UE by higher layers (such as the Radio Resource Control (RRC) layer) and $n_{PUCCH} = n_{CCE} + N_{PUCCH}$. For a Time Division Duplex (TDD) system, the determination of $n_{PUCCH}$ is more involved but the same mapping principle using the CCEs of the DL SA applies.

FIG. 6 further illustrates the transmission of an SA using CCEs. After channel coding and rate matching of the SA information bits (not shown), the encoded SA bits are mapped to CCEs in the logical domain. The first 4 CCEs, CCE1 601, CCE2 602, CCE3 603, and CCE4 604 are used for the SA transmission to UE1. The next 2 CCEs, CCE5 611 and CCE6 612, are used for the SA transmission to UE2. The next 2 CCEs, CCE7 621 and CCE8 622, are used for the SA transmission to UE3. Finally, the last CCE, CCE9 631, is used for the SA transmission to UE4. After further processing which can include bit-scrambling, modulation, interleaving, and mapping to REs 640, each SA is transmitted in the PDCCH region of the DL sub-frame 650. At the UE receiver, the reverse operations are performed (not shown for brevity) and if the SA is correctly decoded (as determined by the UE through a Cyclic Redundancy Check (CRC) which is masked with the UE identity), the UE proceeds to receive the associated PDSCH (DL SA) or to transmit the associated PUSCH (UL SA).

A one-to-one mapping exists between the resources for HARQ-ACK signal transmission and the CCEs used for the DL SA transmission. For example, if a single resource is used for HARQ-ACK signal transmission, it may correspond to the CCE with the lowest index for the respective DL SA. Then, UE1, UE2, UE3, and UE4 use respectively PUCCH resource 1, 5, 7, and 9 for their HARQ-ACK signal transmission. Alternatively, if multiple CCEs are used for a DL SA transmission, HARQ-ACK information may not only be conveyed by the modulated HARQ-ACK signal but it may also be conveyed by the selected resource (corresponding to one of the multiple CCEs used to convey the DL SA). If all resources within a PUCCH RB are used, the resources in the immediately next RB can be used.

In order to support data rates higher than the ones possible in legacy FDD communication systems operating with a single Component Carrier (CC), BWs larger than the ones of a CC for legacy communications may be used. These larger BWs can be achieved through the aggregation of multiple CCs. For example, a BW of 100 MHz results from the aggregation of five 20 MHz CCs. The Node B can configure communication with a UE over multiple CCs. The PDSCH reception by a UE in each DL CC is configured by a respective DL SA as described in FIG. 6. In TDD systems, higher data rates either in the DL or in the UL can be achieved by allocating a larger number of sub-frames to the specific link. Similar to the aggregation of multiple CCs, in case of multiple DL sub-frames, PDSCH reception in each DL sub-frame is configured by a respective DL SA.

The transmission of HARQ-ACK signals associated with DL SA receptions by a UE in multiple DL CCs can be in the PUCCH of a single UL CC which will be referred to as "primary" UL CC for the UE (the primary UL CC is UE-specific). Separate resources in the primary UL CC can be RRC-configured to UEs for the transmission of HARQ-ACK signals in response to DL receptions in multiple DL CCs.

FIG. 7 illustrates the HARQ-ACK signal transmissions corresponding to DL SA receptions in 3 DL CCs, DL CC1 710, DL CC2 720, and DL CC3 730, that occur in the primary UL CC 740. The resources for the HARQ-ACK signal transmissions corresponding to DL SA receptions in DL CC1, DL CC2, and DL CC3 are respectively in a first set 750, second set 760, and third set 770 of PUCCH resources.

A first approach for a UE to transmit HARQ-ACK signals in response to DL SA receptions in N>1 DL CCs is to simultaneously transmit in N>1 HARQ-ACK channels in the respective resources of the primary UL CC. A second approach is to select the resource used for the HARQ-ACK signal transmission depending on the value of the transmitted HARQ-ACK bits in addition to transmitting a modulated HARQ-ACK signal, as in 3GPP Evolved Universal Terrestrial Radio Access (E-UTRA) Long Term Evolution (LTE) TDD. In both cases, separate resources for the HARQ-ACK signal transmission are needed in response to DL SA reception for each DL CC. A third approach is to jointly code all HARQ-ACK bits and transmit a single HARQ-ACK signal in an exclusive RRC-configured resource for each UE.

For the transmission of HARQ-ACK signals in the primary UL CC, if the provisioned resources correspond to all CCEs used for SA transmissions in each DL CC, the resulting overhead can be substantial as many DL CCs may exist. A UE receiving SAs in a subset of the DL CCs may not know the number of CCEs used in other DL CCs and therefore cannot know the number of respective HARQ-ACK resources in a sub-frame. As a consequence, the maximum number for the HARQ-ACK resources, corresponding to the maximum number of CCEs in each DL CC, needs to be assumed. If less than the maximum HARQ-ACK resources are used in a sub-frame, the remaining ones cannot usually be assigned to other UL transmissions, such as PUSCH transmissions, resulting to BW waste.

As the number of UEs with reception of DL SAs for multiple DL CCs per sub-frame is typically not large, a pool of resources can be configured by RRC for HARQ-ACK signal transmissions. The resource for HARQ-ACK signal transmission in response to the DL SA reception for the DL CC linked to the primary UL CC can still be determined from the CCE with the lowest index for the respective DL SA. The link between a DL CC and an UL CC is in the conventional sense of a single-cell communication system. Assigning to each UE through RRC signaling unique resources for HARQ-ACK signal transmissions avoids resource collision but it results to resource waste if the UE does not have any DL SA reception in a sub-frame. Assigning to a UE through RRC signaling shared resources with other UEs for HARQ-ACK signal transmissions reduces the probability of resource waste at the expense of scheduler restrictions as UEs with shared resources for HARQ-ACK signal transmissions cannot receive respective DL SAs in the same sub-frame.

The previous considerations apply regardless of the specific method used for the HARQ-ACK signal transmission in the PUCCH or the respective resource determination if one or more PUCCH resources need be reserved for each UE while only a fraction of these resources is typically used in each sub-frame.

Therefore, there is a need to reduce the resource overhead for HARQ-ACK signal transmissions in a primary UL CC.

There is also a need to avoid collisions among resources for HARQ-ACK signal transmissions from multiple UEs.

Finally, there is a need to determine rules for assigning resources for HARQ-ACK signal transmissions to a UE.

SUMMARY OF THE INVENTION

Accordingly, the present invention has been designed to solve at least the above-mentioned limitations and problems in the prior art. The present invention provides methods and apparatus for a UE to determine the resource for an HARQ-ACK signal transmission in response to the reception by the UE of DL SAs transmitted by a Node B in multiple Component Carriers (CCs) or multiple DL sub-frames.

In accordance with one embodiment of the present invention, the DCI format conveying each DL SA consists of Information Elements (IEs) that include a Transmission Power Control (TPC) IE providing a TPC command for the UE to adjust the transmission power of the HARQ-ACK signal. The TPC IE in the DCI format conveying the DL SA for the DL CC linked to the primary UL CC is used for its intended purpose of adjusting the HARQ-ACK signal transmission power while the TPC IE in the DCI format conveying the DL SA for any other of the DL CCs the UE is configured is used to indicate to the UE the resource, from a set of configured resources, for the HARQ-ACK signal transmission.

In accordance with another embodiment of the present invention, the DCI format conveying each DL SA consists of Information Elements (IEs) that include a Transmission Power Control (TPC) IE providing a TPC command for the UE to adjust the transmission power of the HARQ-ACK signal and a Downlink Assignment Index (DAI) IE providing the relative order of the multiple DL SAs for which the UE generates an HARQ-ACK signal. The TPC IE in the DCI format conveying the DL SA that the DAI IE indicates to be the first one is used for its intended purpose of adjusting the HARQ-ACK transmission power while the TPC IE in the DCI format conveying a DL SA that the DAI IE indicates to not be the first one is used to indicate to the UE the resource, from a set of configured resources, for the HARQ-ACK signal transmission.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

The present invention will now be described more fully hereinafter with reference to the accompanying drawings. This invention may, however, be embodied in many different forms and should not be construed as limited to the embodiments set forth herein. Rather, these embodiments are provided so that the disclosure is thorough and complete and fully conveys the scope of the invention to those skilled in the art.

Additionally, although the present invention is described in relation to an Orthogonal Frequency Division Multiple Access (OFDMA) communication system, it also applies to all Frequency Division Multiplexing (FDM) systems in general and to Single-Carrier Frequency Division Multiple Access (SC-FDMA), OFDM, FDMA, Discrete Fourier Transform (DFT)-spread OFDM, DFT-spread OFDMA, SC-OFDMA, and SC-OFDM in particular.

Methods and apparatus are described for a UE to determine the resource for a HARQ-ACK signal transmission, in response to multiple DL SA receptions in multiple DL CCs or in multiple DL sub-frames.

One aspect of the present invention provides the relative indexing of available resources for HARQ-ACK signal transmissions in the primary UL CC. These resources may be RRC-configured or dynamically determined through the respective DL SA. RRC-configured resources can be considered but the same principles directly apply for dynamically determined ones (repeating such description is omitted for brevity).

In the first case, all UEs having HARQ-ACK signal transmission in the same primary UL CC are also assumed to receive SAs in the DL CC linked to the primary UL CC or be able to reliably receive the corresponding PCFICH. The DL CC linked to the primary UL CC will be referred to as primary DL CC. The resource for HARQ-ACK signal transmission in response to a DL SA for the primary DL CC is assumed to be determined from the CCE with the lowest index for the respective DL SA. The resource for HARQ-ACK signal transmission in response to a DL SA for a DL CC other than the primary DL CC is configured through RRC signaling for each UE and is determined relative to the total number of resources required for HARQ-ACK signal transmissions in response to DL SAs in the primary DL CC which are in turn determined by the PDCCH size in the primary DL CC.

Figure 8:
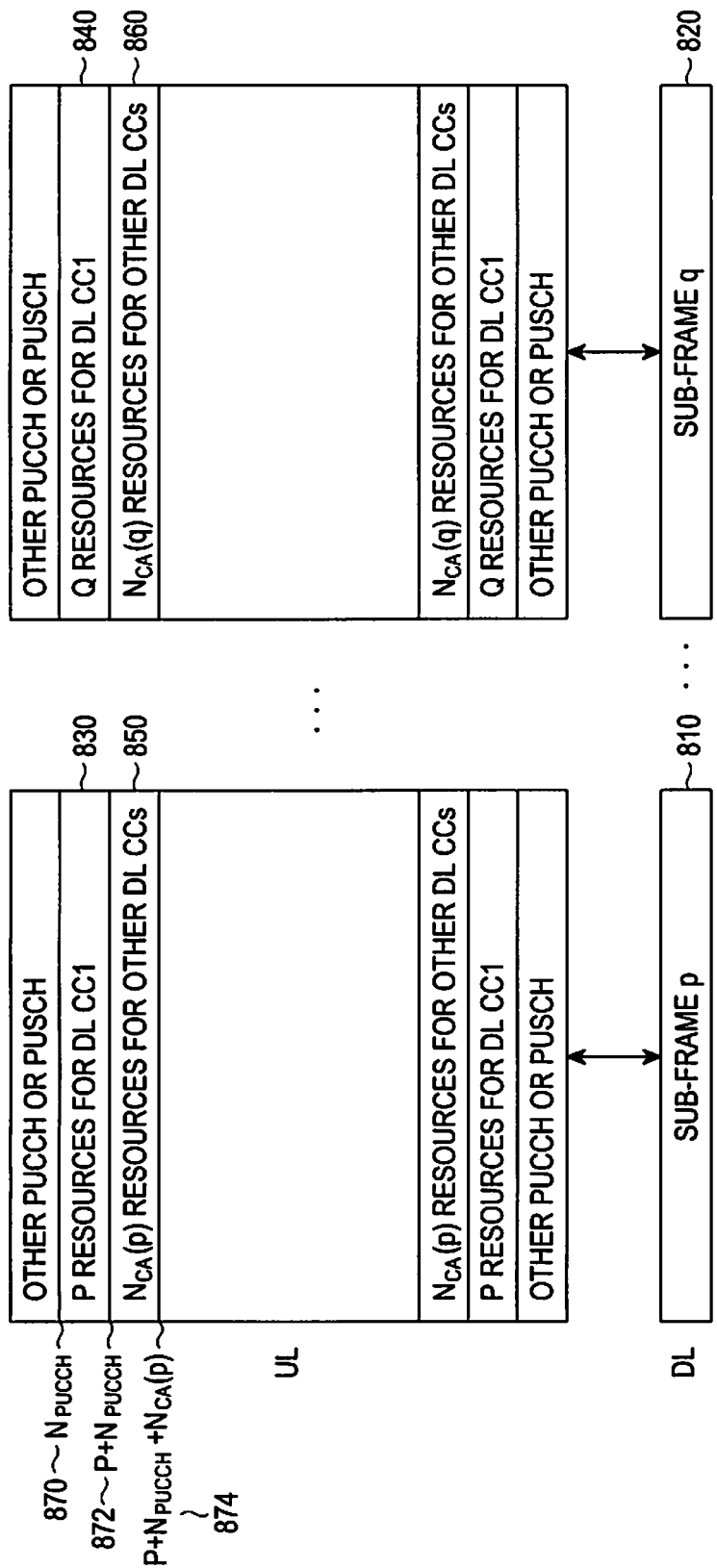
FIG. 8 is a diagram illustrating an example for the generation of HARQ-ACK signal transmission resource using the CCEs conveying the multiple SAs for the respective multiple DL CCs assuming that the UE receives all SAs in the DL CC linked to the primary UL CC, according to an embodiment of the present invention.

FIG. 8 illustrates the first case described above. In the primary DL CC, the PDCCH occupies P CCEs in sub-frame p 810 and Q CCEs in sub-frame q 820. As each UE having the same primary UL CC receives a SA in the primary DL CC, or reliably receives the PCFICH in the primary DL CC, it knows the available resources for the transmission of HARQ-ACK signals in the primary UL CC in response to DL SAs in the primary DL CC (DL CC1). These resources are determined by the total number of CCEs in the primary DL CC which equal P in sub-frame p 830 and Q in sub-frame q 840. Therefore, a UE knows that its RRC-configured resources for HARQ-ACK signal transmissions are indexed after the P+$N_{PUCCH}$ resource in sub-frame p (the first RRC-configured resource is indexed as P+1+$N_{PUCCH}$ and counting starts from 1) and are indexed after the Q+$N_{PUCCH}$ resource in sub-frame q (the first RRC-configured resource is indexed as Q+1+$N_{PUCCH}$). Assuming that the number of RRC-configured resources for HARQ-ACK signal transmission corresponding to DL SA receptions in sub-frames p and q are respectively $N_{CA}(p)$ and $N_{CA}(q)$, the total number of resources for HARQ-ACK signal transmissions in sub-frame p is P+$N_{PUCCH}$+$N_{CA}(P)$ 850 and the total number of resources for HARQ-ACK signal transmissions in sub-frame q is Q+$N_{PUCCH}$+$N_{CA}(q)$ 860. The resource indexing before the beginning of each region is shown for the upper part of the BW is sub-frame p, 870, 872, 874, and can be extended in the same manner for the lower part of the BW and for sub-frame q (omitted for brevity). A single value of $N_{CA}$ may apply to all sub-frames, that is $N_{CA}(p)=N_{CA}(q)$, ∀p, q, until updated through broadcast signaling. Moreover, as the Node B knows of the resources used by each UE, the UEs may not need to be informed of the $N_{CA}$ value if they determine the resources for HARQ-ACK signal transmissions in response to DL SAs for DL CCs other than the primary DL CC relative to the total number of resources for HARQ-ACK signal transmissions in response to DL SAs in the primary DL CC.

In the second case, some of the UEs having HARQ-ACK signal transmissions in the same primary UL CC do not receive a SA in the primary DL CC and cannot be assumed to reliably receive the PCFICH in the primary DL CC. Then, the resources for HARQ-ACK signal transmissions in response to DL SAs in DL CCs other than the primary DL CC are still RRC-configured for each UE but they are determined relative to the maximum number of resources required for HARQ-ACK signal transmissions in response to DL SAs in the primary DL CC. That is, the maximum PDCCH size in a given sub-frame is always assumed in the primary DL CC for the purposes of indexing the resources for HARQ-ACK signal transmissions in response to DL SAs for DL CCs other than the primary DL CC. The resources for HARQ-ACK signal transmissions in response to DL SAs transmitted in the primary DL CC are still determined from the CCE with the lowest index for the respective DL SA.

Figure 9:
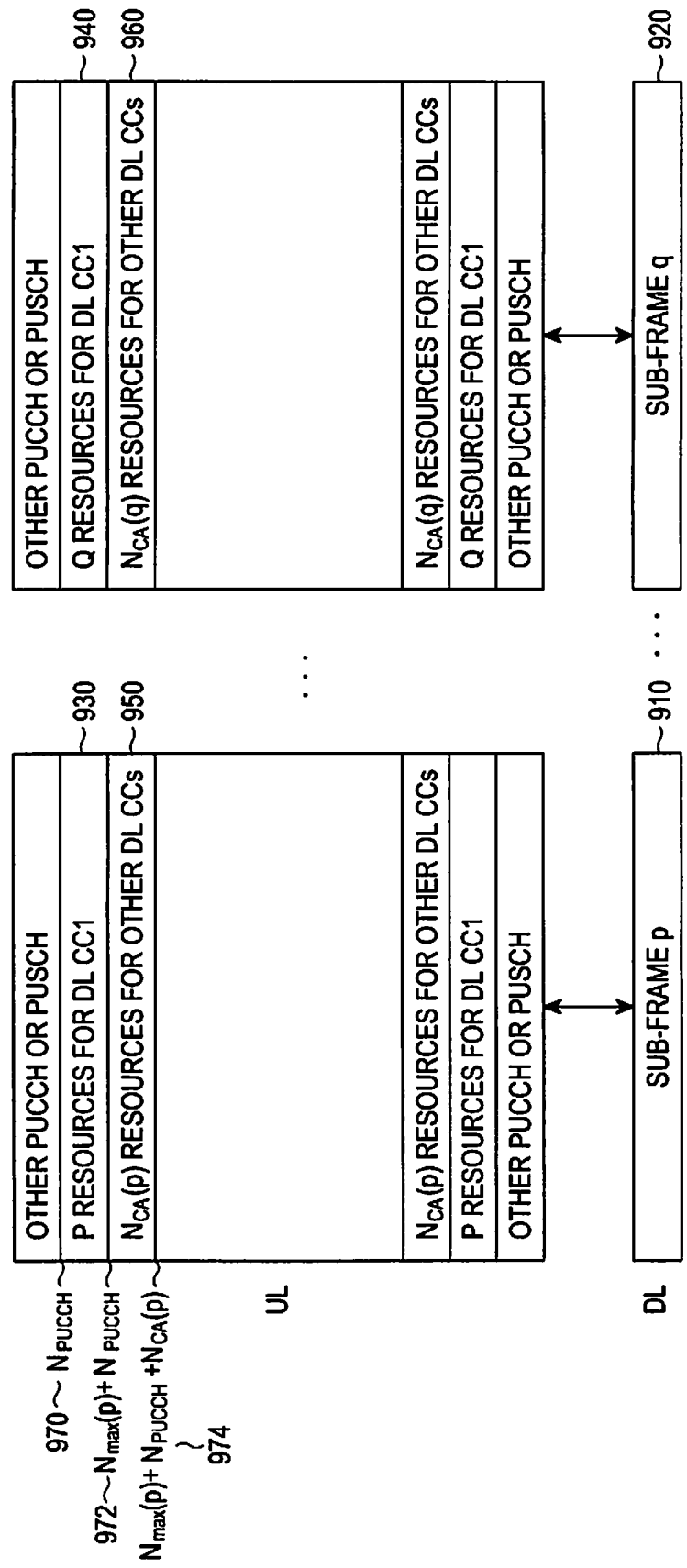
FIG. 9 is a diagram illustrating an example for the generation of HARQ-ACK signal transmission resource using RRC configured resources assuming that the UE receives multiple SAs for respective multiple DL CCs where some SAs are received in DL CCs not linked to the primary UL CC, according to an embodiment of the present invention.

FIG. 9 illustrates the second case described above. In the primary DL CC, the PDCCH occupies P CCEs in sub-frame p 910 while the PDCCH occupies Q CCEs in sub-frame q 920. As some UEs having the same primary UL CC do not receive a SA and do not reliably receive the PCFICH in the primary DL CC, each such UE cannot know the resources required for the transmission of HARQ-ACK signals in the primary UL CC in response to DL SAs in the primary DL CC (DL CC1). These resources are determined by the total number of CCEs in the primary DL CC for the transmission of SAs which equal P in sub-frame p 930 and Q in sub-frame q 940. Therefore, if $N_{max}(j)$ are the maximum number of CCEs for SA transmissions in sub-frame j, a UE knows that its RRC configured resources for HARQ-ACK signal transmissions are indexed after the $N_{max}(j)+N_{PUCCH}$ resources (the first RRC-configured resource is indexed as $N_{max}(j)+1+N_{PUCCH}$, counting starts from 1). Assuming that the last RRC-configured resource for HARQ-ACK signal transmission in sub-frame p is $N_{CA}(p)$ and the last RRC-configured resource for HARQ-ACK signal transmission in sub-frame q is $N_{CA}(q)$, the total number of resources for HARQ-ACK signal transmissions in sub-frame p is $N_{max}(p)+N_{PUCCH}+N_{CA}(p)$ 950 and the total number of resources for HARQ-ACK signal transmissions in sub-frame q is $N_{max}(q)+N_{PUCCH}+N_{CA}(q)$ 960. The resource indexing before the beginning of each region is shown for the upper part of the BW is sub-frame p, 970, 972, 974, and can be extended in the same manner for the lower part of the BW and for sub-frame q (omitted for brevity).

Another aspect of the present invention provides the actual indexing of RRC-configured, or dynamically determined through the respective DL SA, resources for HARQ-ACK signal transmissions in the primary UL CC.

Once the relative indexing of the RRC-configured (or dynamically determined) resources for HARQ-ACK signal transmissions in the primary UL CC is determined, additional indexing of the RRC-configured (or dynamically determined) resources is needed in order to avoid a large overhead. This is because even if the number of UEs having DL SAs in multiple DL CCs per sub-frame is small, many UEs potentially having DL SAs in multiple DL CCs may exist and, as they are configured resources for HARQ-ACK signal transmissions through RRC signaling, these resources need to remain assigned to UEs even if they do not have any DL SAs in a sub-frame since fast reassignment of RRC-configured resources is either not possible or is inefficient in terms of the required signaling.

Assuming a total of M UEs potentially having a DL SA in each of K DL CCs and that the resource for each HARQ-ACK signal transmission in response to a DL SA in the primary DL CC is determined from the CCE with the lowest index for the respective DL SA, the number of RRC-configured resources is M·(K−1). For M=100 and an average value of K=3, a total of 200 resources need to be RRC-configured to each UE in order to uniquely assign each resource and avoid potential collisions or scheduler restrictions. Further assuming a multiplexing capacity of 18 HARQ-ACK signals per RB, as described in Table 1, a total of about 11 RBs is required in the primary UL CC to support HARQ-ACK transmissions in RRC-configured resources. This overhead is substantial although it is a conservative estimate as multiplexing 18 HARQ-ACK signals in a single RB results significant interference (the interference increases by 10 $\log_{10}(18)$=12.55 deciBels (dBs) relative to a single HARQ-ACK signal transmission per RB). Additionally, more than M=100 UEs may be configured DL SA reception in multiple DL CCs (although only a small fraction of them may actually have DL SA reception per sub-frame). To reduce the overhead associated with RRC-configured resources for HARQ-ACK signal transmissions, the invention provides that these resources may be shared among UEs and additional indexing can apply to avoid potential collisions.

A DL SA conveys multiple Information Elements (IEs) enabling different aspects for PDSCH reception. Among the IEs in the DL SA is the IE providing Transmission Power Control (TPC) commands in order for the UE to adjust the power of the subsequent HARQ-ACK signal transmission. Since the HARQ-ACK signal transmission is assumed to be in the primary UL CC, and not in multiple UL CCs, only a single TPC command is needed. The invention provides that this TPC IE is provided by the DL SA transmitted in the primary DL CC a UE is configured and, with multiple such DL SAs, the TPC command is provided by the DL SA scheduling PDSCH reception in the primary DL CC. The invention also provides that all DL SAs include the TPC IE, regardless if the TPC IE from only one DL SA is used for its intended purpose. The remaining TPC IEs (which may be set to have the same value) can be used to index the RRC-configured resources for the HARQ-ACK signal transmissions corresponding to the respective DL SAs. Therefore, for a given UE, denoting by $n_{PUCCH}(0)$ the resource available for HARQ-ACK signal transmission corresponding to the DL SA for the primary DL CC, and by $n_{PUCCH}(j), j>0$ the resource available for HARQ-ACK signal transmission corresponding to the DL SA in a DL CC other than the primary DL CC, it is:

$$n_{PUCCH}(j)=f(n_{PUCCH}(0),TPC(j)), j>0$$

The present invention also provides that the above embodiment utilizing the TPC IE to dynamically index RRC-configured resources for HARQ-ACK signal transmissions can be generalized to include the introduction of a new IE in the DL SAs that is used for such indexing. Denoting the IE used for HARQ-ACK Resource Indexing as HRI IE, the resource used for HARQ-ACK signal transmission can be determined as $$n_{PUCCH}(j)=f(n_{PUCCH}(0),HRI(j)), j>0$$

where j denotes the DL CC index. The HRI IE may also be used to index the resources for HARQ-ACK signal transmissions in response to DL SAs in the primary DL CC (the link to the lowest CCE index may not apply).

Figure 10:
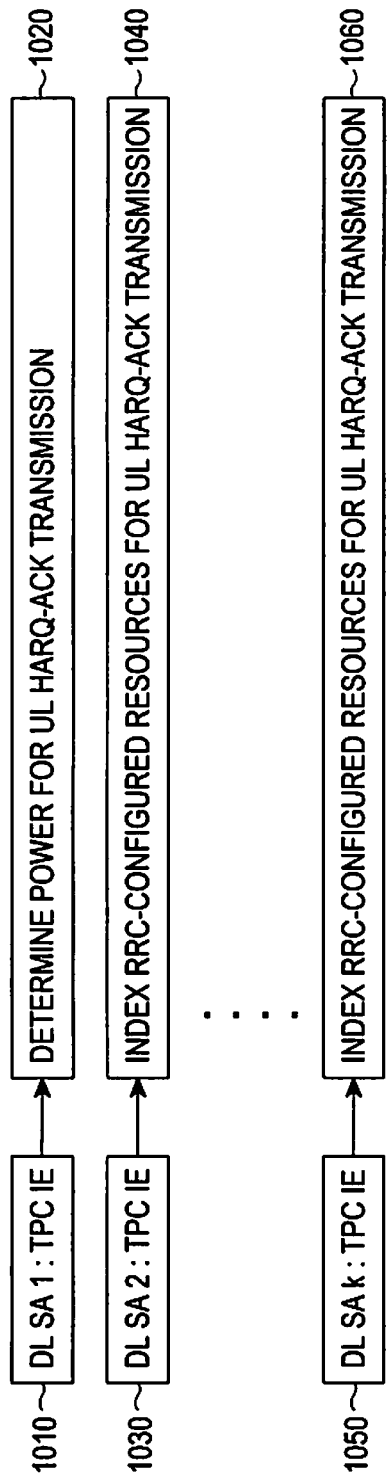
FIG. 10 illustrates the principle of using the bits of the TPC IE in DL SAs to index the resource for the HARQ-ACK signal a UE transmits in response to the reception of multiple DL SAs, according to an embodiment of the present invention.

FIG. 10 illustrates indexing the resource for the HARQ-ACK signal transmission in response to the reception of multiple DL SAs using the TPC IE bits in the DL SAs. The TPC IE in DL SA1 in the primary DL CC 1010 is used by the UE to determine the power for the HARQ-ACK signal transmission 1020 in response to the respective DL SA reception. The TPC IE in DL SA2 1030 through DL SA K 1050 is used as an index for the RRC configured resource for the HARQ-ACK signal transmission 1040 through 1060, respectively.

Figure 11:
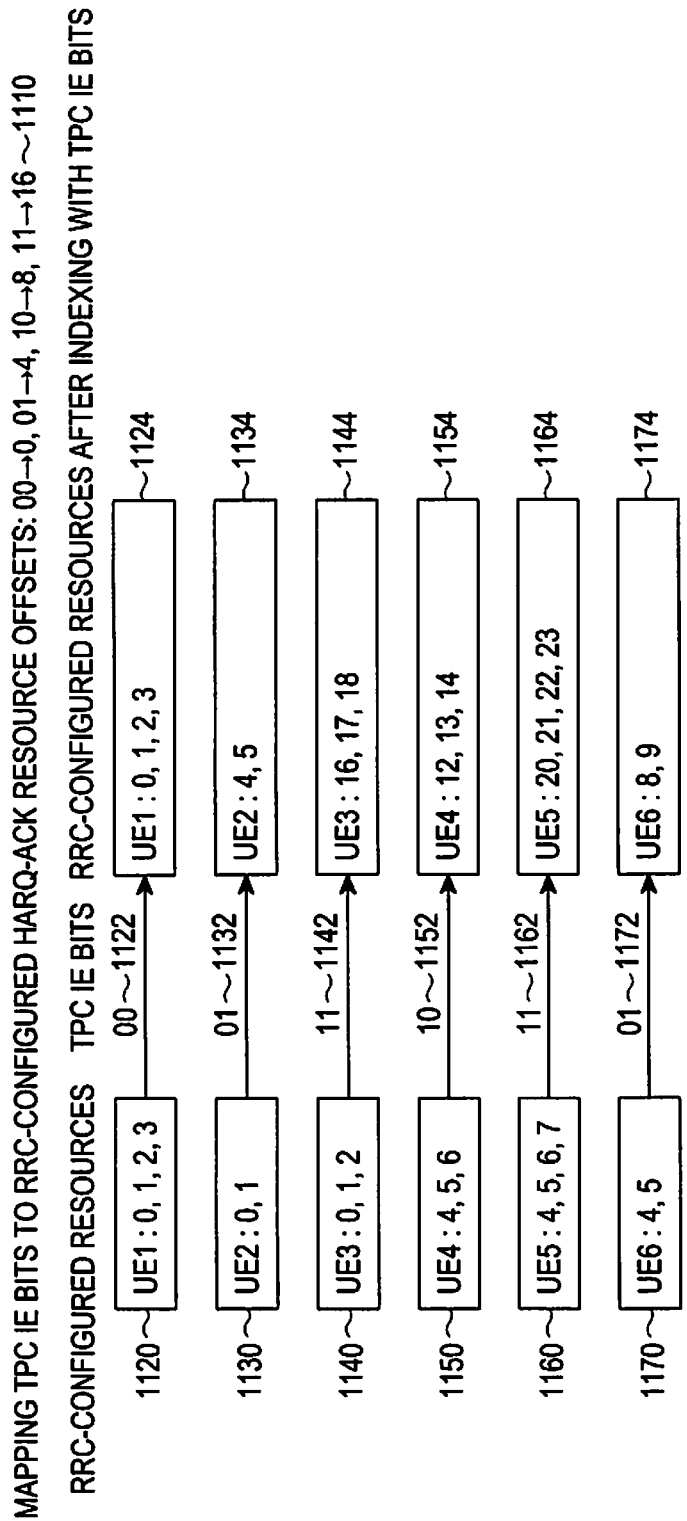
FIG. 11 illustrates a step-wise mapping between the offset applied to RRC-configured HARQ-ACK resources and the values for the TPC IE, according to an embodiment of the present invention.
Figure 12:
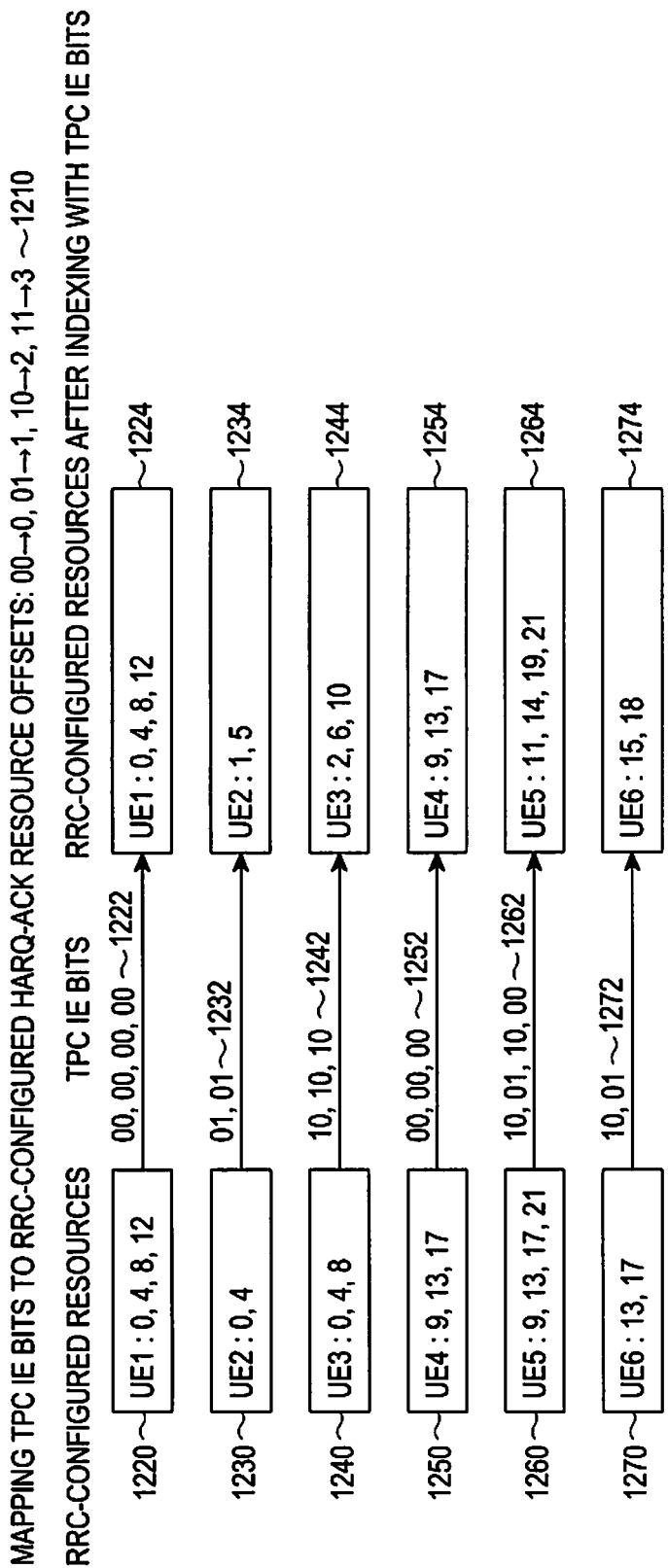
FIG. 12 illustrates a serial mapping between the offset applied to the RRC-configured HARQ-ACK resources and the values for the TPC IE, according to an embodiment of the present invention.

FIG. 11 and FIG. 12 illustrate two specific examples for the general principle in FIG. 10. A UE is assumed to have configured K=5 DL CCs. The TPC IE consists of 2 bits having the values "00", "01", "10", and "11" with each value corresponding to a different offset of the RRC-configured resource for HARQ-ACK signal transmission when the TPC IE is used to index the resource of the HARQ-ACK signal transmission.

FIG. 11 illustrates a step-wise mapping between the offsets applied to the RRC-configured HARQ-ACK resource and the values for the TPC IE bits. The possible mappings are illustrated by reference numeral 1110 where "00" indicates offset 0, "01" indicates offset 4, "10" indicates offset 8, and "11" indicates offset 16. UE1 1120, UE2 1130, and UE3 1140 have overlapping RRC-configured HARQ-ACK resources. UE4 1150, UE5 1160, and UE6 1170 also have overlapping RRC-configured HARQ-ACK resources. Despite the compactness of RRC-configured HARQ-ACK resources (only 8 resources are configured when 18 are needed), the offset applied through the indexing using the TPC IE bits in the respective DL SAs, 1122, 1132, 1142, 1152, 1162, and 1172 removes the overlapping from the resulting HARQ-ACK resources 1124, 1134, 1144, 1154, 1164, and 1174, respectively. The mapping for the resulting resources for HARQ-ACK signal transmission is relatively compact as 24 resources are used when the minimum is 18 (some redundancy is desirable to reduce the interference HARQ-ACK signals experience). It is also observed that the TPC IE bits in each DL SA, other than the DL SA in the primary DL CC, for a given UE have the same value.

FIG. 12 illustrates a serial mapping between the offsets applied to the RRC-configured HARQ-ACK resource and the values for the TPC IE bits. The possible mappings are illustrated by reference numeral 1210 where "00" indicates offset 0, "01" indicates offset 1, "10" indicates offset 2, and "11" indicates offset 3. UE1 1220, UE2 1230, and UE3 1240 have overlapping RRC-configured HARQ-ACK resources. UE4 1250, UE5 1260, and UE6 1270 also have overlapping RRC-configured HARQ-ACK resources. The offset applied through the indexing using the TPC IE bits in the respective DL SAs, 1222, 1232, 1242, 1252, 1262, and 1272 removes the overlapping from the resulting HARQ-ACK resources 1224, 1234, 1244, 1254, 1264, and 1274, respectively. The mapping for the resulting resources for HARQ-ACK signal transmission is again compact as 21 resources are used when the minimum is 18. Basically, the RRC-configured resources need to consider the maximum number of UEs having reception of DL SAs in multiple DL CCs per sub-frame and the number of such DL CCs. The 2 bits in the TPC IE can then be used to avoid the collision of resources for the HARQ-ACK signal transmission from up to 4 UEs that happen to have the same RRC-configured HARQ-ACK resource for the DL SA in a DL CC.

Another aspect of the present invention provides resource determination for the HARQ-ACK signal transmission when a DL SA also includes a counter IE, which will be referred to as Downlink Assignment Indicator (DAI) IE, which indicates the number of the DL SA. For example, if a UE is configured 4 DL CCs, the DAI IE may have the values of 1, 2, 3, and 4 in the DL SAs scheduling PDSCH reception in the primary DL CC, and in the second, third, and fourth DL CCs, respectively. The same applies for a TDD system and single CC operation, with DL sub-frames replacing DL CCs, and the DAI IE may have the values of 1, 2, 3, and 4 in the DL SAs scheduling PDSCH reception in the first, second, third, and fourth DL sub-frames, respectively. The TPC IE provided by the DL SA scheduling PDSCH reception in the primary DL CC, or in the first DL sub-frame for TDD systems, is used to determine the power of the HARQ-ACK signal transmission.

Each resource for HARQ-ACK signal transmission in response to PDSCH reception in each of the remaining DL CCs or DL sub-frames (other than the primary DL CC or the first DL sub-frame) is determined as a function of the resource corresponding to the primary DL CC or the first DL sub-frame, the TPC IE and the DAI IE in the DL SAs for the respective DL CCs or DL sub-frames. For a given UE, denoting by $n_{PUCCH}(0)$ the resource used for the HARQ-ACK signal transmission in the primary DL CC or first DL sub-frame, and by $n_{PUCCH}(j)$, $j>0$ the resource used in a DL CC or DL sub-frame other than the primary DL CC or first DL sub-frame, respectively, it is:

$$n_{PUCCH}(j)=f(n_{PUCCH}(0),\text{HRI}(j),\text{DAI}(j)), j>0.$$

Moreover, as previously mentioned, a HRI IE may be introduced in the DL SAs for indexing the resource used for the respective HARQ-ACK signal transmission. Then, the resource can be determined as:

$$n_{PUCCH}(j)=f(n_{PUCCH}(0),\text{HRI}(j),\text{HRI}(j)), j>0.$$

Figure 13:
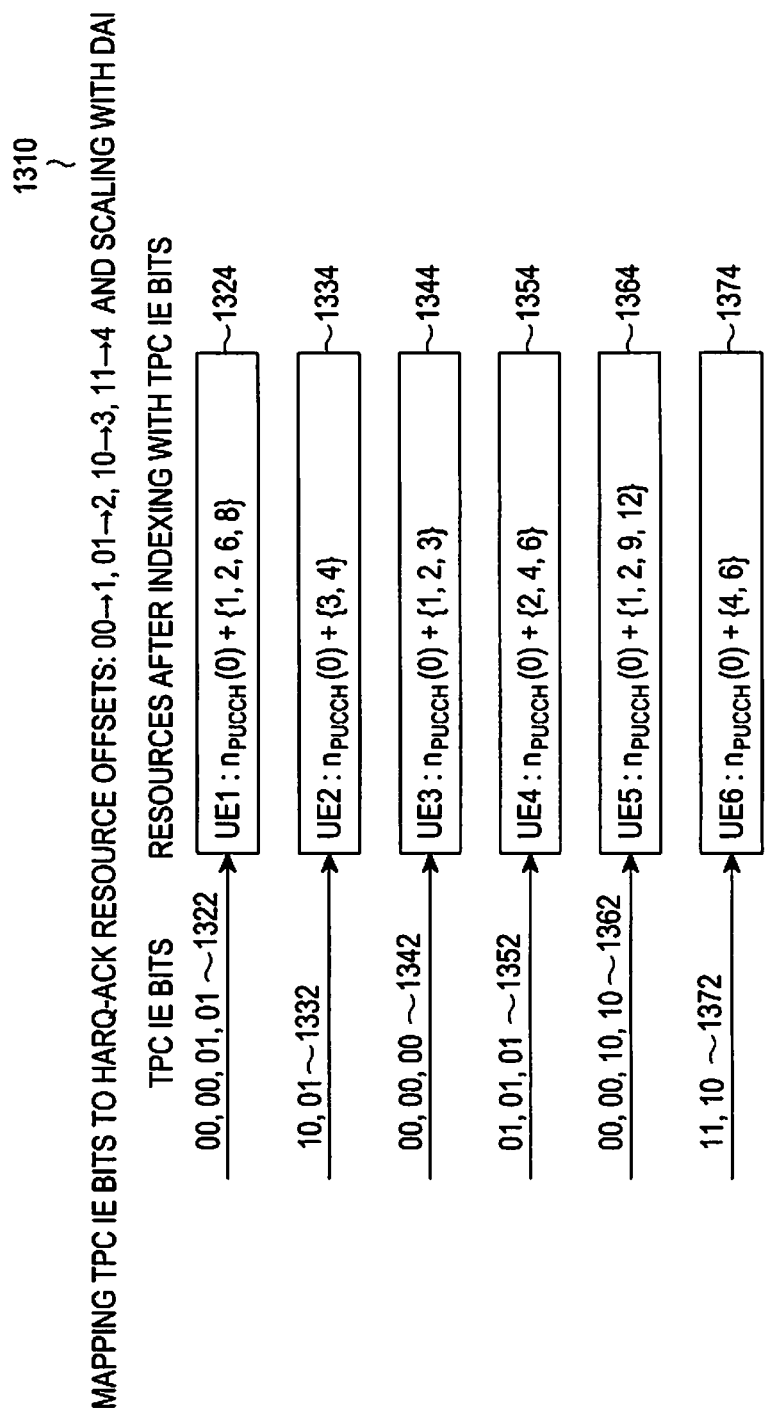
FIG. 13 illustrates a HARQ-ACK resource mapping for DL SAs in DL CCs, other than the primary DL CC, as a function of the resource for the primary DL CC, the TPC IE, and the DAI IE in the respective DL SAs, according to an embodiment of the present invention.

FIG. 13 illustrates resource mapping for HARQ-ACK signal transmission in response to the reception of DL SAs in DL CCs, other than the primary DL CC, as a function of the resource corresponding to the primary DL CC, the TPC IE, and the DAI IE in the respective DL SA. The TPC IE bits in each DL SA, other than the DL SA for the primary DL CC, are used to indicate the HARQ-ACK signal transmission resource. The possible mappings are illustrated by reference numeral 1310 where "00" indicates offset 1, "01" indicates offset 2, "10" indicates offset 3, and "11" indicates offset 4. The offset values may also depend on whether the UE is configured transmitter diversity for the HARQ-ACK signal transmission in which case different offset values may be used, such as 2, 4, 6, and 8, respectively (assuming 2 transmitter antennas). UE1, UE2, UE3, UE4, UE5, and UE6 successfully receive DL SAs in 4, 2, 3, 3, 4, and 2 DL CCs (other than the primary DL CC), respectively, with each DL SA conveying a TPC IE value 1322, 1332, 1342, 1352, 1362, and 1372, respectively. In the mapping of FIG. 13, the resource for the HARQ-ACK signal transmission is obtained by scaling the offset value specified by the TPC IE by the value of the DAI IE and adding the result to the resource for the HARQ-ACK signal transmission in response to the DL SA reception in the primary DL CC, 1324, 1334, 1344, 1354, 1364, and 1374, respectively. The DAI IE values are in ascending order for each DL SA reception (starting from 0 for the PDSCH reception in the primary DL CC). Therefore, for a given UE in FIG. 13, the resource $n_{PUCCH}(j)$, $j>0$ for HARQ-ACK signal transmission in response to PDSCH reception in DL CC j is $n_{PUCCH}(j)=n_{PUCCH}(0)+\text{TPC}\cdot\text{DAI}$, $j>0$.

Figure 1:
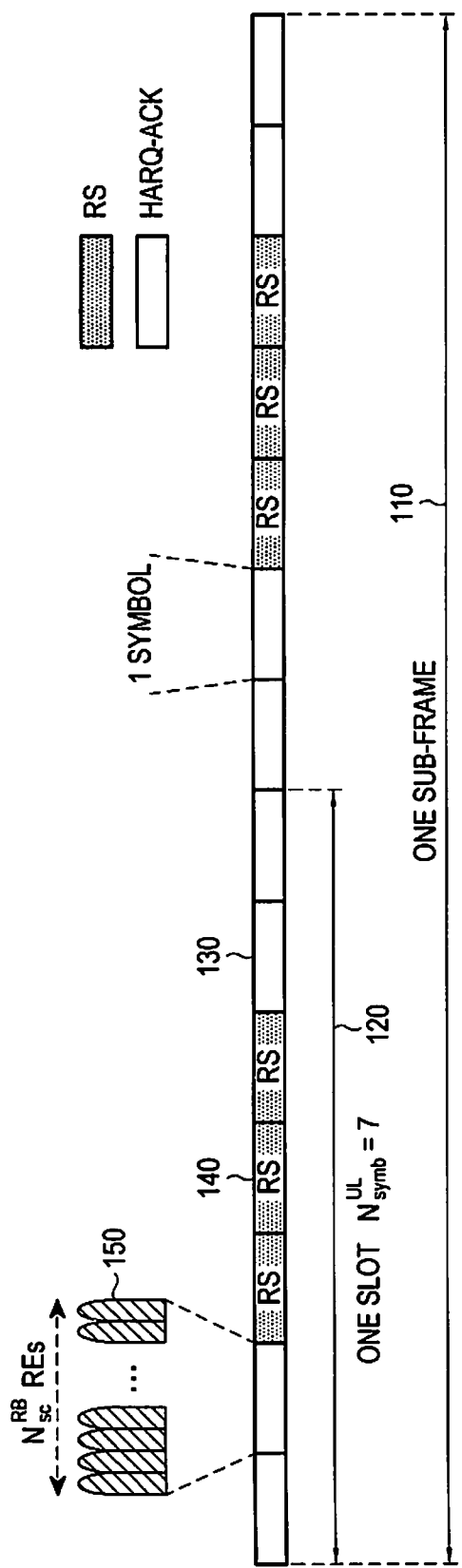
FIG. 1 is a diagram illustrating a PUCCH sub-frame structure for the transmission of a HARQ-ACK signal.
Figure 2:
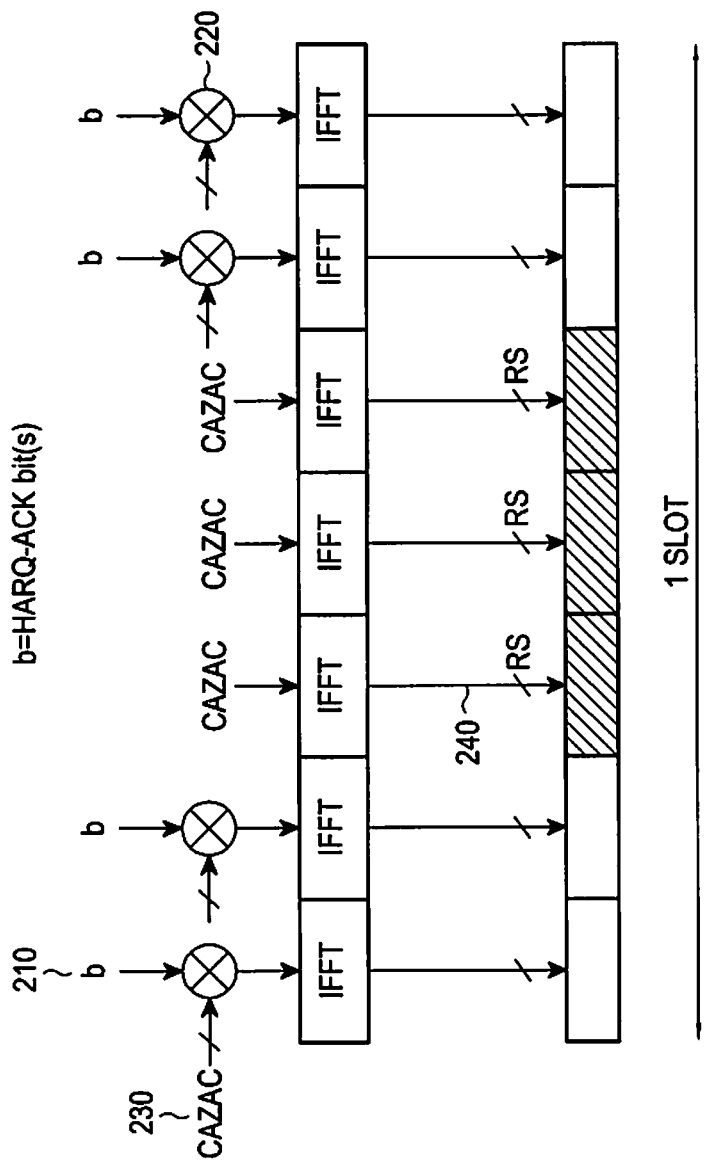
FIG. 2 is a diagram illustrating a structure for a HARQ-ACK signal transmission using a CAZAC sequence in one slot of a PUCCH sub-frame.
Figure 3:
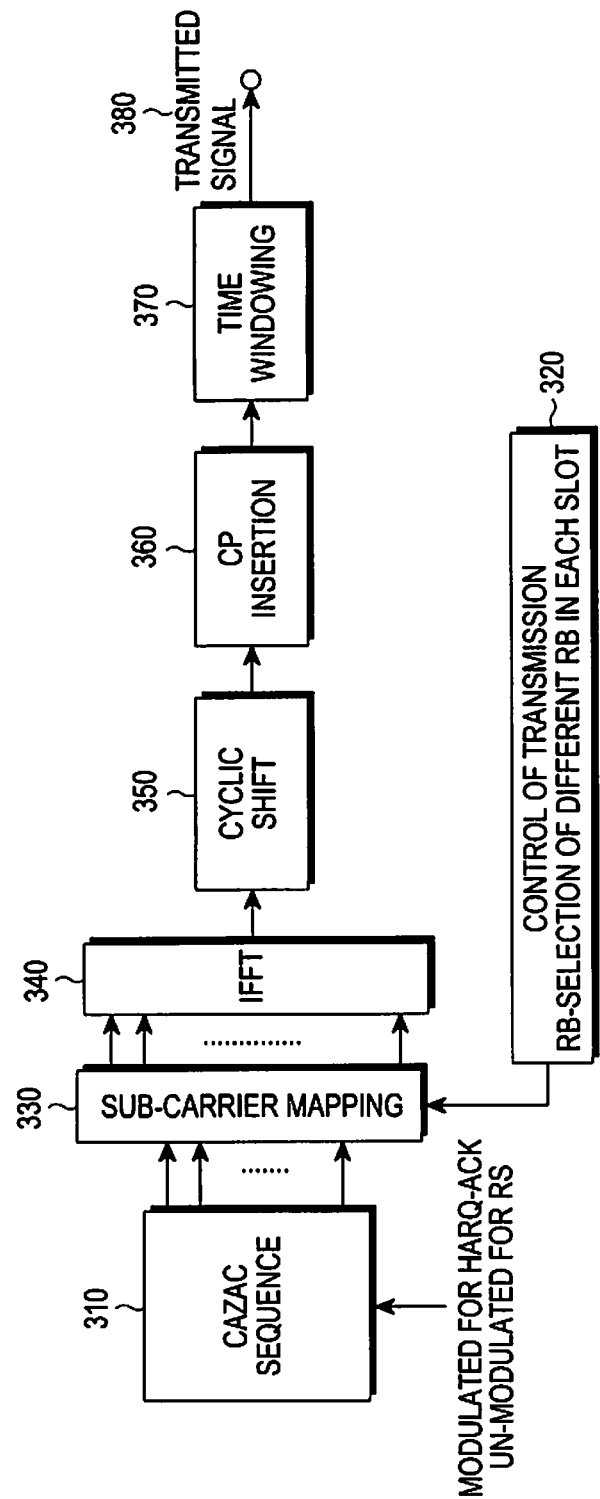
FIG. 3 is a block diagram illustrating a transmitter structure for a CAZAC sequence.
Figure 14:
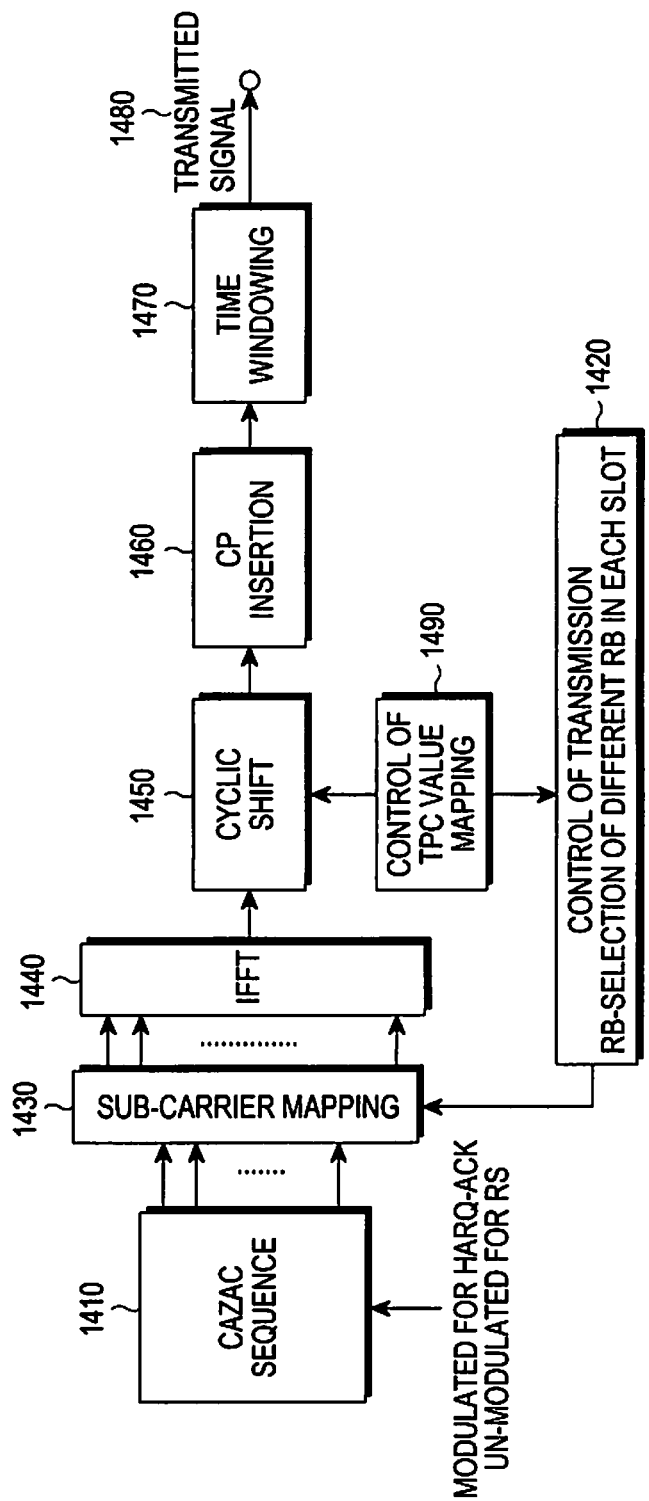
FIG. 14 illustrates a block diagram of the HARQ-ACK signal transmitter including a controller for selecting the resource according to the TPC IE value, according to an embodiment of the present invention.

FIG. 14 illustrates a block diagram of the UE transmitter for the HARQ-ACK signal transmission. The main components are as described in FIG. 3 with the exception that the RRC-configured resource used for the HARQ-ACK signal transmission depends on the offset specified by the controller for the mapping of the TPC IE (or of the HRI IE) value 1490 which the UE obtains from the respective DL SA. The frequency-domain version of a computer generated CAZAC sequence 1410 is used. The CAZAC sequence is mapped to a sub-carrier 1430, IFFT is performed 1440 and a cyclic shift 1450 is performed. The resource includes the RB 1420 and the CS 1450 (and also the OCC—not shown for simplicity). FIG. 14 can be modified in a trivial manner for the controller to include the DAI IE, in addition to the TPC IE. Finally, the CP 1460 and filtering 1470 are applied to the transmitted signal 1480.

Figure 4:
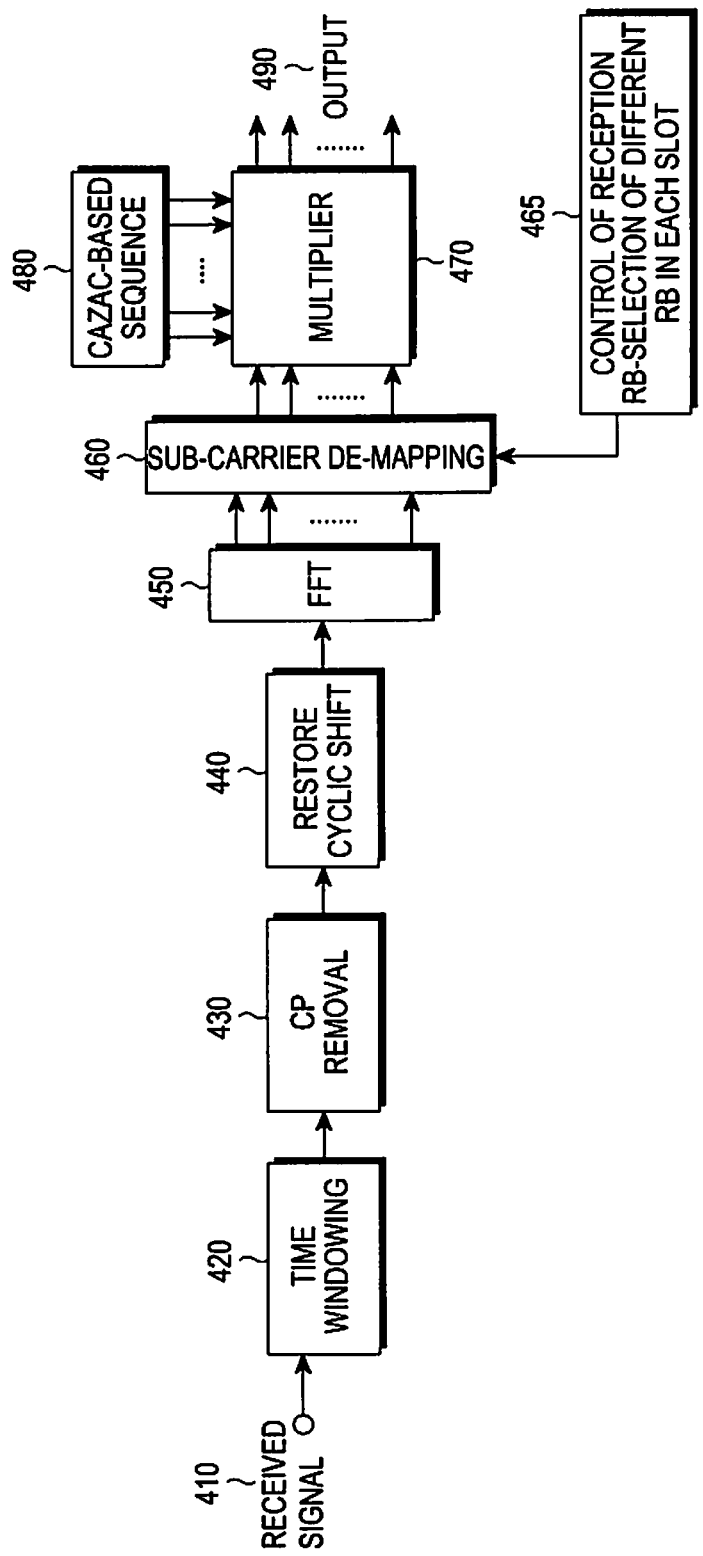
FIG. 4 is a block diagram illustrating a receiver structure for a CAZAC sequence.
Figure 5:
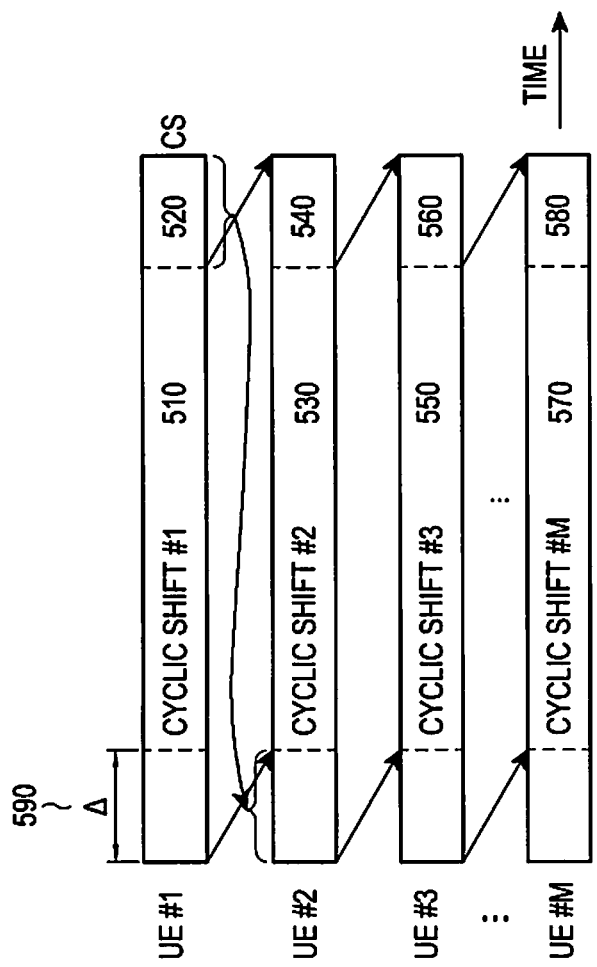
FIG. 5 is a diagram illustrating a multiplexing of CAZAC sequences through the application of different cyclic shifts.
Figure 6:
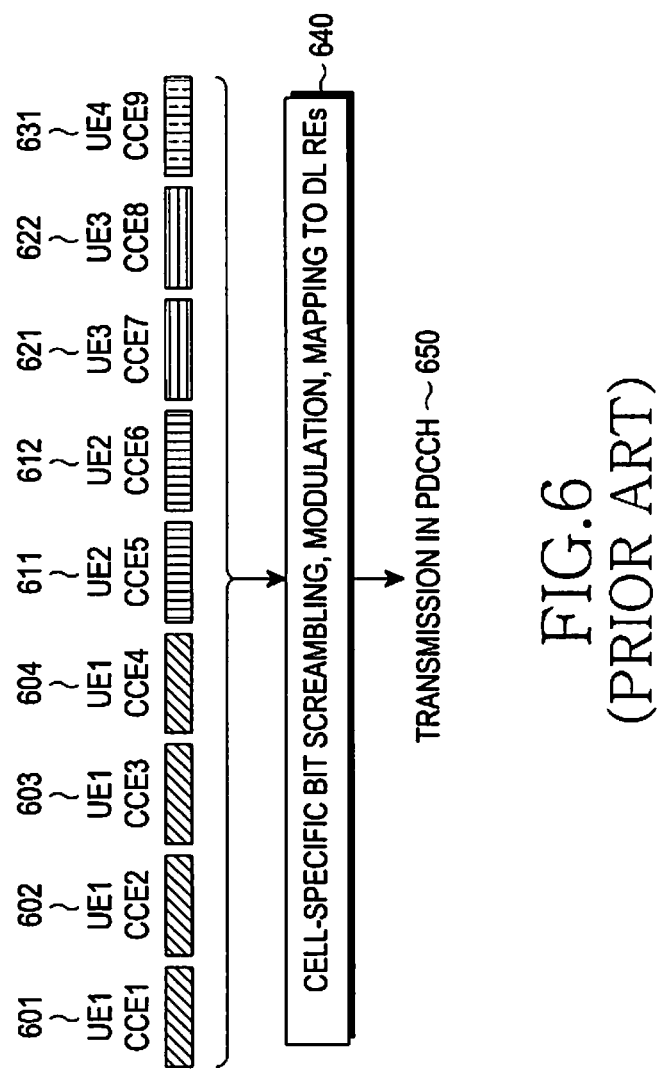
FIG. 6 is a block diagram illustrating the transmission of SAs using PDCCH CCEs.
Figure 7:
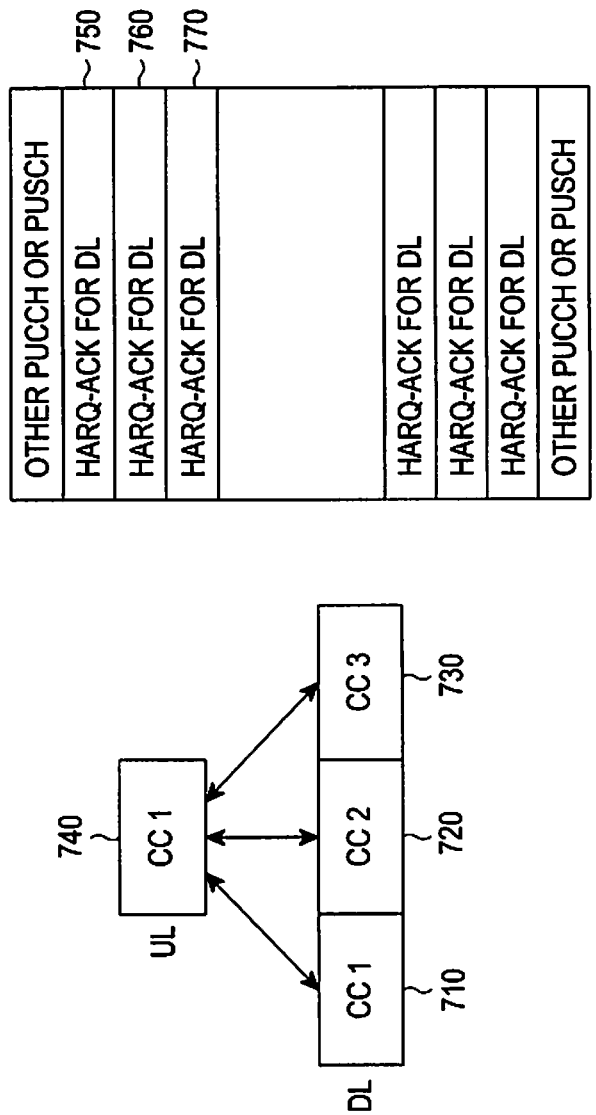
FIG. 7 is a diagram illustrating the availability of different resources for HARQ-ACK signal transmission in an UL CC in response to the reception of multiple SAs for respective multiple DL CCs.
Figure 15:
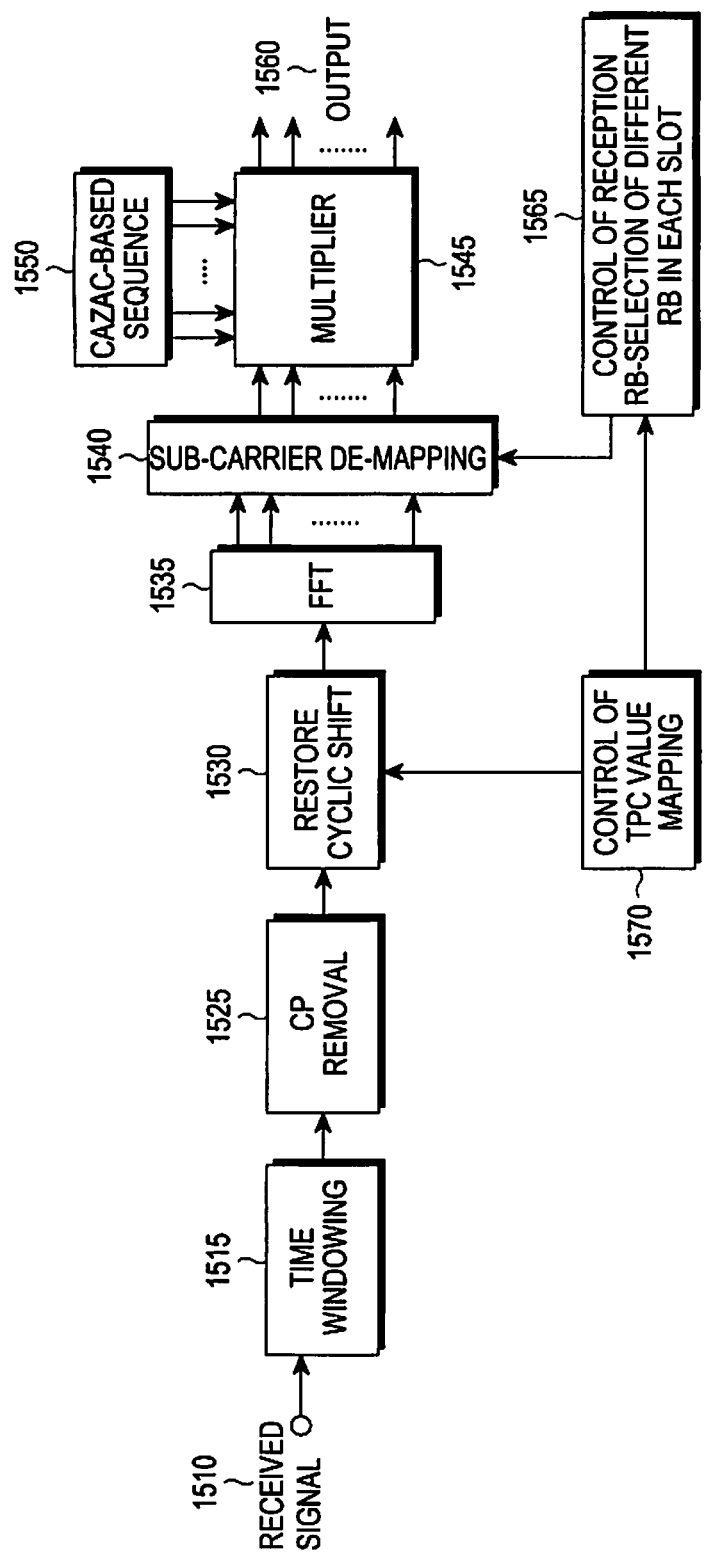
FIG. 15 illustrates a block diagram of the HARQ-ACK signal receiver including a controller for selecting the resource according to the TPC IE value, according to an embodiment of the present invention.

FIG. 15 illustrates a block diagram of the Node B receiver for the HARQ-ACK signal reception. The main components are as described in FIG. 4 with the exception that the RRC-configured resource used for the HARQ-ACK signal reception depends on the offset specified by the controller for the mapping of the TPC IE (or of the HRI IE) value 1510 which the Node B included in the respective DL SA. The resource includes the RB 1565 and the CS 1530 (and also the OCC—not shown for simplicity). The digital received signal 1510 is filtered 1515 and the CP is removed 1525. Subsequently, the CS is restored 1530, a Fast Fourier Transform (FFT) 1535 is applied and the output of the FFT 1535 is de-mapped to a sub-carrier 1540. And the signal is correlated by the multiplier in Step 1545 with the replica of the CAZAC sequence in Step 1550. The output 1560 can then be passed to a channel estimation unit, such as a time-frequency interpolator for the RS, or to a detection unit for the transmitted HARQ-ACK signal.

FIG. 15 can be modified in a trivial manner for the controller to include the DAI IE, in addition to the TPC IE.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for a User Equipment (UE) to determine a resource for a transmission of an acknowledgement signal in an Uplink (UL) Component Carrier (CC) in response to a reception by the UE of multiple Scheduling Assignments (SAs), in a communication system wherein the UE receives multiple SAs transmitted by a base station and corresponds to respective multiple Downlink (DL) CCs, wherein each SA consists of Information Elements (IEs) that include a Transmission Power Control (TPC) IE, with each IE having a value represented by binary elements, the method comprising the steps of:

using by the UE the TPC IE value in the SA corresponding to a first DL CC, from the multiple DL CCs, for adjusting the transmission power of the acknowledgment signal;

using by the UE the TPC IE value in each SA corresponding to each of the remaining DL CCs, from the multiple DL CCs, for determining the resource used for the transmission of the acknowledgment signal; and transmitting the acknowledgement signal.

2. The method of claim 1, wherein the first DL CC from the multiple DL CCs is linked to the UL CC of the acknowledgement signal transmission.

3. The method of claim 1, wherein the TPC IEs in the SAs corresponding to the remaining DL CCs from the multiple DL CCs have the same value.

4. The method of claim 1, wherein the UE determines the resource used for the transmission of the acknowledgment signal from a set of resources that is explicitly configured by the base station.

5. The method of claim 1, wherein the UE implicitly determines a resource available for the transmission of the acknowledgement signal in response to the reception of the SA corresponding to the first DL CC from the multiple DL CCs and the UE is explicitly configured by the base station a set of resources available for the transmission of the acknowledgement signal in response to the reception of the SAs corresponding to the remaining DL CCs from the multiple DL CCs.

6. The method of claim 1, wherein the UE determines a pair of resources if it configured transmission antenna diversity for the acknowledgement signal transmission.

7. A method for a User Equipment (UE) to determine a resource for a transmission of an acknowledgement signal in response to a reception by the UE of multiple Scheduling Assignments (SAs), in a communication system wherein the UE receives multiple SAs transmitted by a base station, wherein each SA consists of Information Elements (IEs) that include a Transmission Power Control (TPC) IE and a Downlink Assignment Index (DAI) IE providing a relative order for the multiple SAs, each IE having a value represented by binary elements, the method comprising the steps of:

using by the UE the TPC IE value in the SA indicated by the respective DAI IE to be the first SA of the multiple SAs for adjusting the transmission power of the acknowledgment signal;

using by the UE the TPC IE value in each SA indicated by the respective DAI IE to not be the first SA of the multiple SAs for determining the resource used for the transmission of the acknowledgment signal; and transmitting the acknowledgement signal.

8. The method of claim 7, wherein the UE determines the resource used for the transmission of the acknowledgment signal from a set of resources that is explicitly configured by the base station.

9. The method of claim 7, wherein the UE implicitly determines a resource available for the acknowledgement signal transmission in response to the reception of the first SA from the multiple SAs and the UE is explicitly configured by the base station a set of resources available for the acknowledgement signal transmission in response to the reception of the remaining SAs from the multiple SAs.

10. The method of claim 7, wherein the UE determines a pair of resources if it configured transmission antenna diversity for the acknowledgement signal transmission.

11. A User Equipment (UE) apparatus for transmitting an acknowledgement signal in an Uplink (UL) Component Carrier (CC) of a communication system in response to the reception of multiple Scheduling Assignments (SAs) transmitted by a base station for respective multiple Downlink (DL) CCs, wherein each SA consists of Information Elements (IEs) that include a Transmission Power Control (TPC) IE, with each IE having a value represented by binary elements, the apparatus comprising:

a transmission power unit for adjusting the transmission power of the acknowledgement signal in response to the TPC IE value in the SA for a first DL CC from the multiple DL CCs;

a controller for selecting the resource for the acknowledgement signal transmission in response to the TPC IE value in each SA corresponding to each of the remaining DL CCs from the multiple DL CCs; and a transmitter transmitting the acknowledgement signal.

12. The apparatus of claim 11, wherein the first DL CC from the multiple DL CCs is linked to the UL CC of the acknowledgement signal transmission.

13. The apparatus of claim 11, wherein the TPC IEs in the SAs corresponding to the remaining DL CCs from the multiple DL CCs have the same value.

14. The apparatus of claim 11, wherein the resource selected for the transmission of the acknowledgement signal is from a set of resources that is explicitly configured by the base station.

15. The apparatus of claim 11, wherein the resource available for the transmission of the acknowledgement signal in response to the reception of the SA for the first DL CC from the multiple DL CCs is implicitly selected and the resources available for the transmission of the acknowledgement signal in response to the reception of the SAs for the remaining DL CCs from the multiple DL CCs are selected from a set of resources explicitly configured by the base station.

16. The apparatus of claim 11, wherein a pair of resources is selected if the acknowledgement signal is transmitted using transmission antenna diversity.

17. A User Equipment (UE) apparatus for transmitting an acknowledgement signal in response to the reception of multiple Scheduling Assignments (SAs) transmitted by a base station, wherein each SA consists of Information Elements (IEs) that include a Transmission Power Control (TPC) IE and a Downlink Assignment Index (DAI) IE providing a relative order for the multiple SAs, each IE having a value represented by binary elements, the apparatus comprising:

a transmission power unit for adjusting the transmission power of the acknowledgement signal in response to the TPC IE value in the SA indicated by the DAI IE to be the first SA of the multiple SAs;

a controller for selecting the resource for the acknowledgement signal transmission in response to the TPC IE value in each SA indicated by the respective DAI IE to not be the first SA of the multiple SAs; and a transmitter transmitting the acknowledgement signal.

18. The apparatus of claim 17, wherein the resource selected for the transmission of the acknowledgement signal is from a set of resources explicitly configured by the base station.

19. The apparatus of claim 17, wherein the resource available for the acknowledgement signal transmission in response to the reception of the first SA from the multiple SAs is implicitly selected and the resources available for the transmission of the acknowledgement signal in response to the reception of the remaining SAs from the multiple SAs are selected from a set of resources explicitly configured by the base station.

20. The apparatus of claim 17, wherein a pair of resources is selected if the acknowledgement signal is transmitted using transmission antenna diversity.

* * * * *